United States Patent
Baier

(10) Patent No.: US 10,689,013 B2
(45) Date of Patent: Jun. 23, 2020

(54) TESTING DEVICE AND METHOD FOR CHECKING A DEFINED PROFILE OF A TRAIN OF VEHICLES, IN PARTICULAR RAIL VEHICLES

(71) Applicant: SIEMENS MOBILITY GMBH, Munich (DE)

(72) Inventor: Torsten Baier, Schladen (DE)

(73) Assignee: Siemens Mobility GmbH, Munich (DE)

( * ) Notice: Subject to any disclaimer, the term of this patent is extended or adjusted under 35 U.S.C. 154(b) by 200 days.

(21) Appl. No.: 15/752,700

(22) PCT Filed: Jul. 27, 2016

(86) PCT No.: PCT/EP2016/067859
§ 371 (c)(1),
(2) Date: Feb. 14, 2018

(87) PCT Pub. No.: WO2017/029084
PCT Pub. Date: Feb. 23, 2017

(65) Prior Publication Data
US 2019/0031216 A1  Jan. 31, 2019

(30) Foreign Application Priority Data
Aug. 14, 2015 (DE) .................. 10 2015 215 572

(51) Int. Cl.
*G01M 17/08* (2006.01)
*B61K 9/02* (2006.01)

(52) U.S. Cl.
CPC ............... *B61K 9/02* (2013.01); *G01M 17/08* (2013.01)

(58) Field of Classification Search
CPC ........ B61K 9/02; G01M 17/08; B61L 25/025; B61L 25/028
See application file for complete search history.

(56) References Cited

U.S. PATENT DOCUMENTS

| | | | |
|---|---|---|---|
| 3,705,772 A * | 12/1972 | Andreas ................ | G01B 11/24 356/5.08 |
| 4,179,216 A | 12/1979 | Theurer et al. | |
| 8,239,078 B2 * | 8/2012 | Siddappa ................ | B61C 17/12 455/92 |
| 8,271,153 B2 * | 9/2012 | Kumar ................ | B61L 15/0072 348/148 |

(Continued)

FOREIGN PATENT DOCUMENTS

| | | |
|---|---|---|
| CH | 630854 A5 | 7/1982 |
| CN | 202793331 U | 3/2013 |

(Continued)

*Primary Examiner* — Freddie Kirkland, III
(74) *Attorney, Agent, or Firm* — Laurence Greenberg; Werner Stemer; Ralph Locher

(57) ABSTRACT

A testing device for monitoring a defined profile of a train of vehicles, in particular rail vehicles, including at least one sensor device which is configured to detect compliance or non-compliance with the profile. The sensor device is configured to detect the train in order to improve monitoring of the clearance profile of the train. A vehicle, in particular a rail vehicle, in the form of a train including the testing device and a method for checking a defined profile of a train of vehicles, in particular rail vehicles, are also provided.

19 Claims, 3 Drawing Sheets

(56) References Cited

U.S. PATENT DOCUMENTS

| | | | | |
|---|---|---|---|---|
| 8,761,973 B2* | 6/2014 | Schneider | | B61K 9/02 |
| | | | | 701/19 |
| 9,283,860 B2* | 3/2016 | Estevez | | B60L 5/38 |
| 9,434,397 B2* | 9/2016 | Chung | | B61L 25/025 |
| 9,714,041 B2* | 7/2017 | Oswald | | B61L 15/0072 |
| 9,764,748 B2* | 9/2017 | Brooks | | B61L 23/34 |
| 9,797,801 B2* | 10/2017 | Batcheller | | G01M 7/00 |
| 10,077,061 B2* | 9/2018 | Schmidt | | H04W 4/021 |
| 10,297,153 B2* | 5/2019 | Gao | | B61L 3/008 |
| 10,315,673 B2* | 6/2019 | Chung | | B61L 25/025 |
| 2010/0127133 A1* | 5/2010 | Schrevere | | B61F 19/00 |
| | | | | 246/169 S |
| 2010/0235022 A1* | 9/2010 | Siddappa | | B61C 17/12 |
| | | | | 701/20 |
| 2012/0274759 A1 | 11/2012 | Kaiser et al. | | |
| 2013/0018535 A1* | 1/2013 | Schneider | | B61F 9/00 |
| | | | | 701/19 |
| 2016/0046308 A1* | 2/2016 | Chung | | B61L 25/025 |
| | | | | 701/20 |
| 2016/0339934 A1* | 11/2016 | Chung | | B61L 25/025 |
| 2018/0093685 A1* | 4/2018 | Chung | | B61L 25/025 |

FOREIGN PATENT DOCUMENTS

| | | |
|---|---|---|
| CN | 103207357 A | 7/2013 |
| CN | 203310400 U | 11/2013 |
| DE | 4015086 A1 | 1/1991 |
| DE | 19910795 C1 | 6/2000 |
| DE | 10104837 A1 | 6/2002 |
| DE | 102009043215 A1 | 5/2011 |
| DE | 102014212233 A1 | 12/2015 |
| NL | 7605264 A | 11/1977 |

* cited by examiner

TESTING DEVICE AND METHOD FOR CHECKING A DEFINED PROFILE OF A TRAIN OF VEHICLES, IN PARTICULAR RAIL VEHICLES

BACKGROUND OF THE INVENTION

Field of the Invention

The invention relates to a testing device for monitoring a defined profile of a train of vehicles, in particular rail vehicles, having at least one sensor device, which is designed to detect compliance or non-compliance with the profile.

The invention further relates to a method for checking a defined profile of a train of vehicles, in particular rail vehicles, in which compliance or non-compliance with the profile is detected.

According to statutory and operational specifications, e.g. operators of rail vehicles on railroad tracks are obliged to ensure that the rail vehicles and all devices connected thereto, e.g. goods that have been loaded onto the rail vehicles, comply with the clearance profiles of the railroad tracks being used. If this specification is not satisfied, there is a danger of damage to property and/or injury to persons.

A testing device of the type cited in the introduction is described in DE 40 15 086 A1, for example, in which the train is checked at a measuring portal on a so-called zero track. The device in DE 40 15 086 A1 nonetheless has the disadvantage that failures to comply with the clearance profile which occur after the test, e.g. due to a displacement of the load, cannot be recorded. This problem is solved by the apparatus in DE 10 2009 043 215 A1, for example, in which the clearance profile is tested by sensors along the line when the train travels past.

However, this testing is resource-intensive if the train is to be checked along the entire line.

SUMMARY OF THE INVENTION

The object of the present invention is therefore to provide a testing device and a method of the type cited in the introduction, allowing the clearance profile of a train to be checked along the line in the simplest possible manner.

The testing device cited in the introduction achieves the cited object in that the sensor device is designed for the purpose of detection from onboard the train itself.

The method cited above achieves the object in that the failure to comply with the profile is detected from onboard the train itself.

The inventive solution has the advantage that only one testing device per train is required in order to check the compliance with the clearance profile or another defined profile. It is thereby possible to perform an effective but nonetheless structurally simple check, whose material overheads and costs are significantly lower than those of the apparatus according to the prior art. By virtue of the solution according to the invention, it is moreover possible for continuous checking of the profile to take place because the testing device is arranged on the train and is therefore carried along therewith and permanently available. By virtue of the solution according to the invention, the traction unit driver of the train is relieved because the checking of the clearance profile during the journey is no longer his or her responsibility alone. Instead, the driver is assisted by the inventive solution, which can be performed automatically. In the event that a failure to comply with the clearance profile is detected, an alarm signal can be output to the traction unit driver and/or automatic braking of the train can be initiated, for example.

According to the inventive solution, the sensor device can be arranged on a single vehicle of the train, e.g. the traction unit. As a result, the testing device does not have to be changed if the train is modified.

The inventive solution can be further developed by means of advantageous embodiments as described below.

For example, the testing device can have an evaluation device which is designed to evaluate a test signal that is determined by the sensor device and is representative of the compliance or non-compliance with the profile, at least as a function of an orientation of the train. This has the advantage that the testing device independently recognizes if or when detection of the profile by the sensor device is impossible or erroneous. For example, the sensor device would report the non-compliance with the clearance profile by a rear car of the train in the case of a curved direction of travel, because this would be detected by the inner sensors looking backwards. By virtue of the inventive evaluation device, it is easily possible to exclude erroneous measurements which are caused by the course of the line. Therefore the inventive checking of the clearance profile takes place during the journey while taking into consideration the dynamic movement of the vehicles of the train along the line. This is contrary to the device according to DE 40 15 086 A1, which performs its measurement on an almost ideal track section and therefore does not give any indication of compliance with the profile clearance along the route section to be travelled.

In order to record the orientation of the train in a simple manner, the testing device can have an orientation unit which is designed to determine the orientation of the train or of at least one vehicle of the train. The orientation unit can determine the orientation of the train by means of corresponding sensors, for example, or alternatively by means of evaluating map data for the line combined with a position finding facility, e.g. using GPS coordinates.

In an advantageous embodiment, the orientation unit can comprise a curve sensor which is designed to determine a curved direction of travel of at least one vehicle of the train. This has the advantage that a curved direction of travel is determined independently of other systems such as GPS sensors, for example, and the inventive testing device can therefore work autonomously. Furthermore, the orientation unit can comprise a gradient sensor which is designed to determine a gradient of at least one vehicle of the train. For example, the gradient sensor determines when the train is travelling through a dip or over a hill and therefore any checking of the profile by the sensor device is erroneous.

Furthermore, the orientation unit can comprise a location sensor which determines a location of at least one vehicle of the train relative to the track. The location of the vehicles of the train relative to the track can also have an influence on the usability of the test signals of the sensor device.

In order to determine a curved direction of travel in a particularly simple manner, the orientation unit can have a gyroscope.

In an advantageous embodiment, the sensor device can have at least one profile sensor for determining the outer contour of at least one vehicle of the train. This has the advantage that, by determining the outer contour and comparing it with the permitted profile, it is easily possible to detect the compliance or non-compliance with the profile. In this case, the test signals of the sensor device can be compared with images of a permitted clearance profile, for example.

Furthermore, the testing device can comprise at least one storage device which is designed to store test signals. This has the advantage that test signals of the sensor device can initially be saved continuously, said test signals being provided with a time stamp of their measurement. It is then possible to evaluate those test signals whose time stamps fall in a range in which the orientation of the train was suitable for checking the profile.

In order to collect the results of the profile monitoring at a central point, for example, the testing device can have at least one transmission device which is designed to transmit test signals, in particular wirelessly. Warnings or alarms can then be centrally recorded, either electrically or in the form of data, and processed in suitable systems. For example, transmission to a control center can be effected by means of known transmission techniques such as e.g. CT Mobile TSM, radio data transmission, GSM, etc.

In order to perform the check of the profile effectively, the sensor device can be designed for the purpose of detection in the longitudinal direction of the train.

Detection in the longitudinal direction has the advantage that the whole train can be recorded in the case of a straight-line orientation.

The invention also relates to a vehicle (in particular a rail vehicle) in the form of a train, said vehicle having the inventive testing device in one of the embodiment variants cited above.

In order that the defined profile of the train can be measured in a particularly simple manner, the sensor device of the testing device can be arranged at a distance from the outer contour of the vehicle. Since the clearance profile of a train is greater than the outer contour of the vehicles, and of the traction unit in particular, this development allows the invention to be implemented in a simple manner.

In an advantageous embodiment of the inventive method, it is possible to evaluate a profile signal that has been determined and is representative of the compliance or non-compliance with the profile, at least as a function of an orientation of the train. This embodiment variant of the method has the same advantages as the corresponding embodiment variant of the inventive testing device as described above.

BRIEF DESCRIPTION OF THE SEVERAL VIEWS OF THE DRAWING

The invention is explained below with reference to the exemplary embodiment in the appended drawings, in which.

DESCRIPTION OF THE INVENTION

The invention is described below with reference to the exemplary embodiment variant shown in FIGS. 1 to 4.

Figure 1:
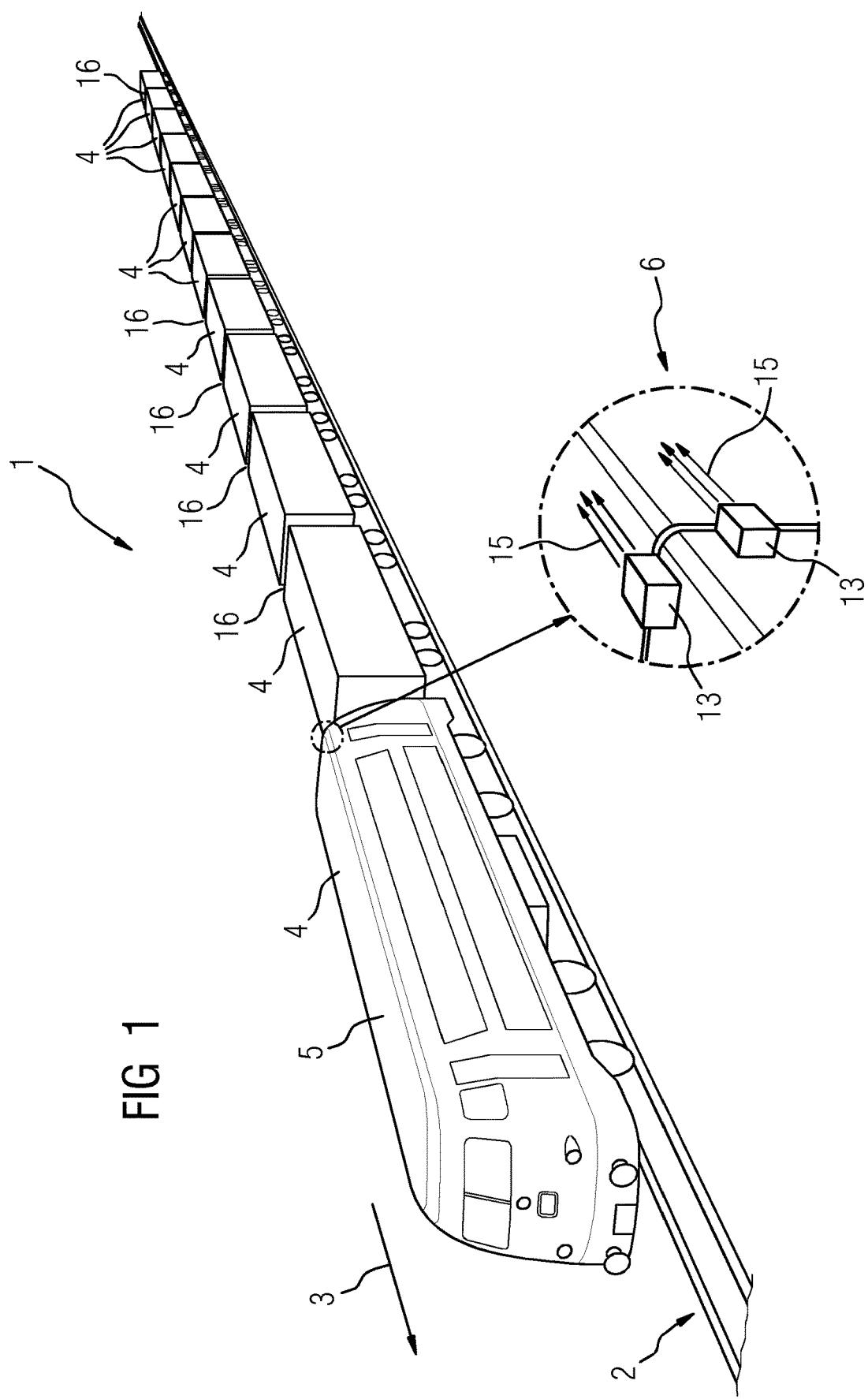
FIG. 1 shows a schematic illustration of a train with an exemplary embodiment variant of the inventive testing device.

FIG. 1 shows a train 1 which is moving on a line 2 in a direction of travel 3. The train 1 consists of a multiplicity of interconnected vehicles 4, the front vehicle 4 being designed as a traction unit 5. The remaining vehicles 4 are illustrated here as goods cars, for example. In the exemplary embodiment variant shown in FIGS. 1 to 4, the traction unit 5 of the train 1 has a testing device 6 for monitoring a defined profile 7 of the train 1. In the exemplary embodiment variant shown in FIGS. 1 to 4, the profile 7 is smaller than a permitted clearance profile 8 for the train 1 and lies within this clearance profile 8. In the exemplary embodiment variant shown in FIGS. 1 to 4, the vehicles 4 are rail vehicles and the traction unit 5 is a locomotive which drives the train 1 on the line 2, this taking the form of tracks 9.

The testing device 6 has a sensor device 10, an evaluation device 11 and an orientation unit 12.

Figure 2:
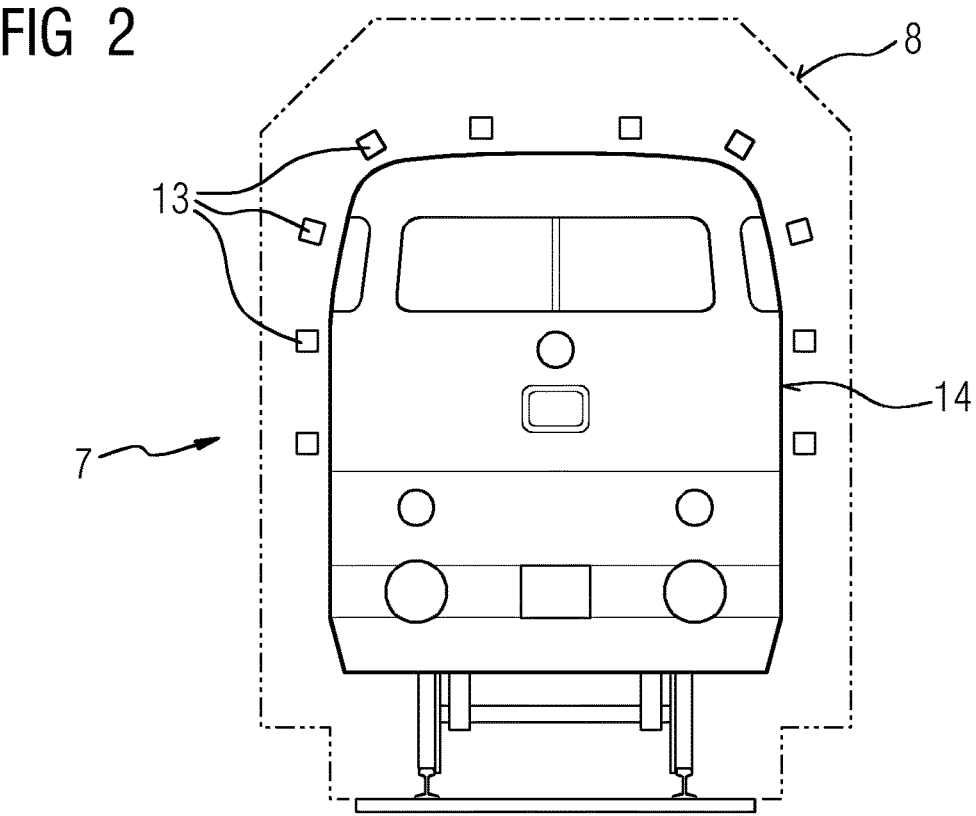
FIG. 2 shows a schematic illustration of a traction unit from the train in FIG. 1, with the exemplary embodiment variant of the inventive testing device.
Figure 3:
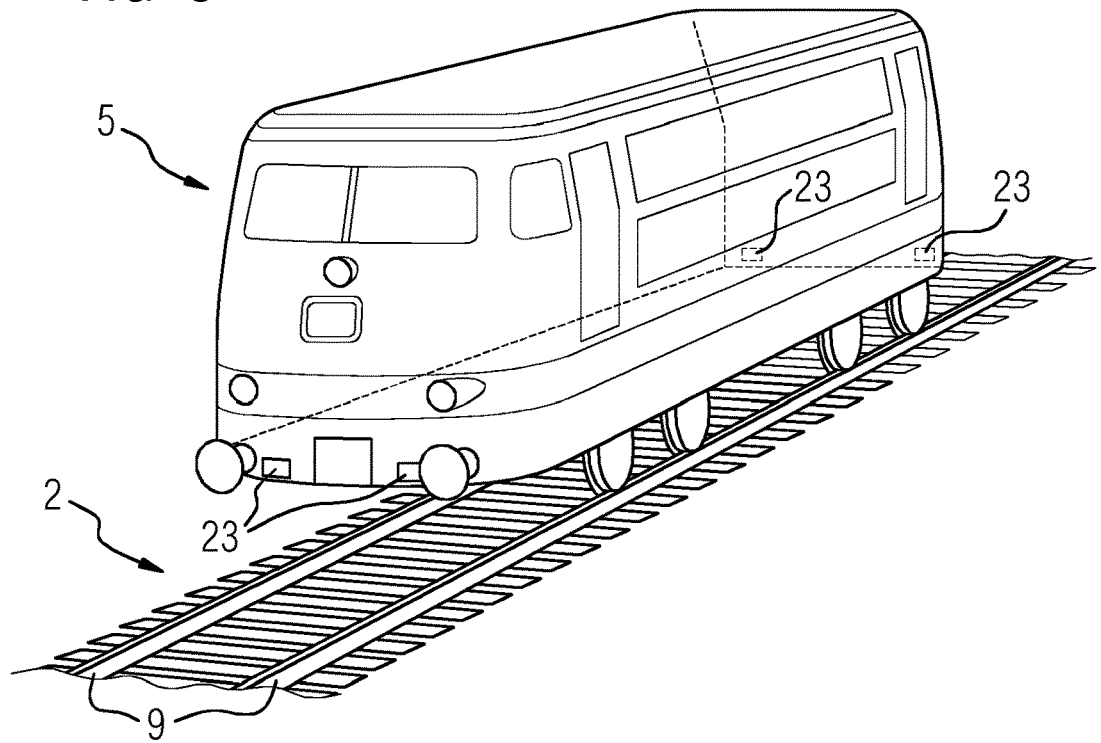
FIG. 3 shows a schematic perspective illustration of the inventive vehicle from FIG. 2.
Figure 4:
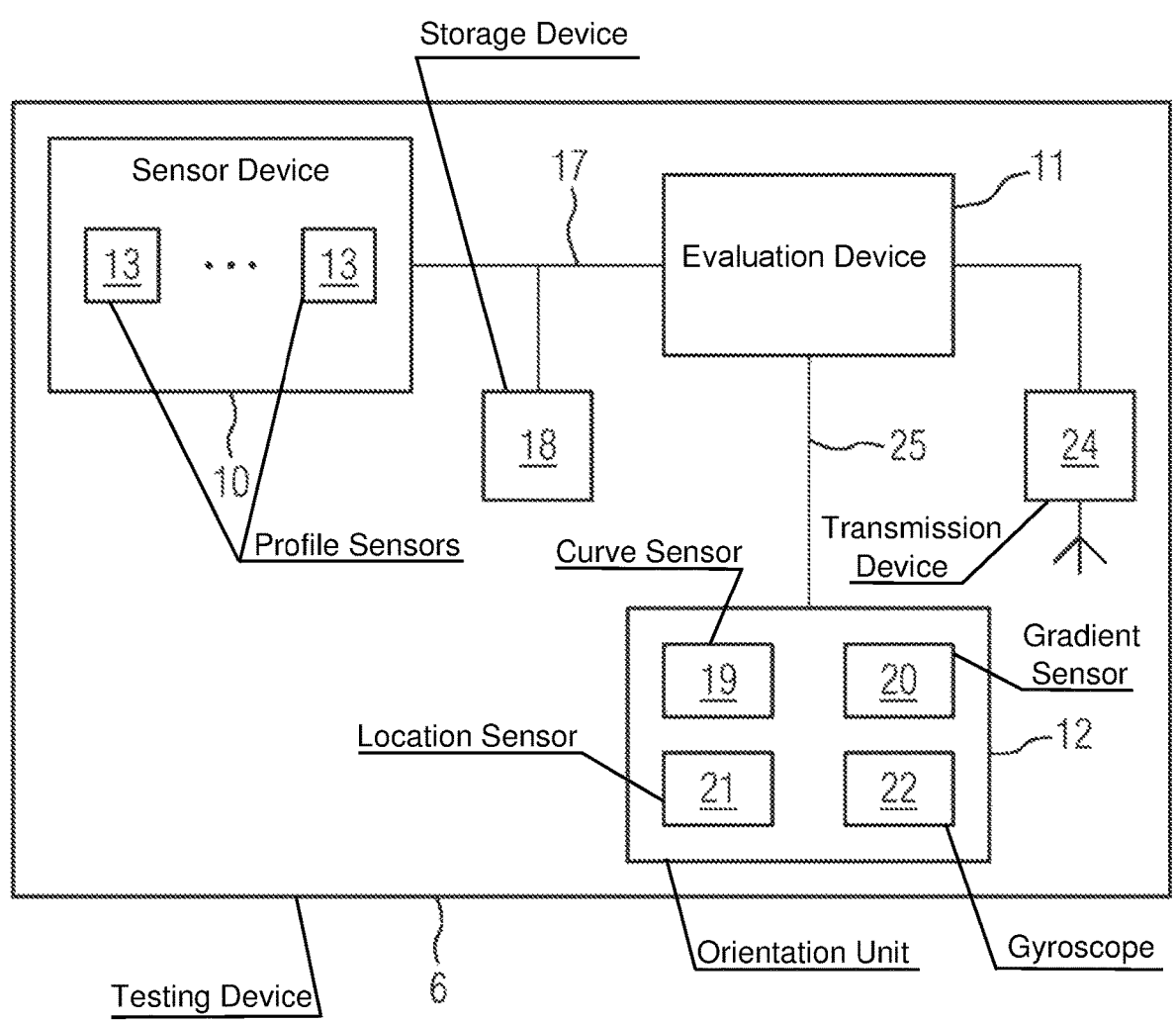
FIG. 4 shows a schematic illustration of an exemplary embodiment variant of the inventive testing device.

The sensor device 10 comprises a plurality of profile sensors 13, which in this embodiment variant are attached to the traction unit 5 along the defined profile 7 as illustrated in FIG. 2. Since an outer contour 14 of the traction unit 5 is smaller than the profile 7, at least some of the profile sensors 13 are attached to the traction unit 5 at a distance from the outer contour 14. For example, the profile sensors 13 can be connected to the vehicle via mounting arms (not shown).

The profile sensors 13 are designed as video cameras, short-wave radiators, lasers or radar sensors, and "view" rearwards, from the traction unit 5 and counter to the direction of travel, to the monitored vehicles 4 of the train 1. The "viewing direction" of the profile sensors 13 is depicted by lines 15 in the detail section of FIG. 1 and essentially extends in the longitudinal direction of the train 1. The profile sensors 13 are designed to work autonomously in the exemplary embodiment variant shown in FIGS. 1 to 4.

Alternatively, the sensor device 10 could also have receivers 16. In this case, the profile sensors 13 would be designed as active transmitters which work together with the receivers 16. During operation, the profile sensors 13 would view the assigned receivers 16 and thus determine the outer contour of the vehicles 4 following the traction unit 5. For example, in the case of very long trains, the measurement could also be sectionally composed. In order to achieve this, the receivers 16 would then form the termination point of a measurement section. The vehicle following the vehicle having the receivers 16 could then be equipped with further profile sensors for the next section.

In this context, a vehicle 4 can be a traction unit, e.g. a locomotive, or a non-driven vehicle such as a car.

In the exemplary embodiment variant shown in FIGS. 1 to 4, the inventive sensor device 10 is attached to the traction unit 5, and therefore the testing device 6 remains operational even if the train 1 is modified, e.g. as a result of vehicles 4 being coupled or decoupled.

By virtue of the inventive testing device 6, the defined profile 7 can be tested continuously during the journey. Since the defined profile 7 is smaller than the prescribed clearance profile 8 in the embodiment variant shown in FIGS. 1 to 4, compliance with the prescribed clearance profile 8 is also tested at the same time.

Since the profile sensors 13 do not return any test signals that are representative of a compliance or non-compliance with the profile 8 when the train 1 has a specific orientation, e.g. a curved direction of travel, the evaluation device 11 is inventively designed to evaluate the test signals 17 output by the sensor device 10 as a function of the orientation of the train 1. Therefore the test signals 17 that are not representative can be in effect excluded. Alternatively, the sensor device 10 could also be activated by the evaluation device 11 only when the orientation is suitable.

The test signals 17 returned by the profile sensors 13 are saved in a storage device 18 in the exemplary embodiment variant shown in FIGS. 1 to 4. The test signals 17 in this case comprise images or measurement data, these being determined by the profile sensors according to the embodiment thereof and provided with a time stamp of their measurement.

The orientation unit 12 comprises a plurality of sensors in order to determine a current orientation of the train. In the exemplary embodiment variant shown in FIGS. 1 to 4, the orientation unit 12 has a curve sensor 19, a gradient sensor 20, a location sensor 21 and a gyroscope 22.

The curve sensor 19 registers a curved direction of travel of the train 1 or traction unit 5 on which it is arranged. As a result of determining the curved direction of travel of the traction unit 5, it is possible to infer the curved direction of travel of the whole train 1. During a curved direction of travel of the train 1, the profile sensors 13 cannot reliably test the profile 7 because the rear vehicles 4 interfere with the view of the profile sensors 13 as a result of the curved direction of travel. The curve sensor 19 can comprise a gyroscope 22, for example, by means of which a curved direction of travel can be registered in a simple manner.

The gradient sensor 20 determines a gradient of the traction unit 5 relative to the following vehicle 4 of the train 1, which occurs when passing through a dip or over a hill, for example. Such an orientation of the train 1 means that the profile sensors 13 cannot reliably record the outer contour and check the profile 7. Therefore the test signals 17 of the profile sensors 13 in this orientation of the train 1 are not representative of a compliance or non-compliance with the profile 7.

The test signals 17 can also be excluded in a defined time window before and/or after a disruptive orientation is determined. The length of the train 1 is thus taken into consideration, for example.

The location sensor 21 determines a location of the traction unit 5 relative to the tracks 9. To this end, the location sensor 21 comprises a plurality of track sensors 23 which measure a position of the traction unit 5 relative to the tracks 9. The location sensor 21 can be used to determine any non-parallelism of the traction unit 5 relative to the tracks 9, which could likewise indicate an orientation of the train 1 that suggests the test signals 17 of the profile sensors 13 might not be representative.

In the exemplary embodiment variant shown in FIGS. 1 to 4, the testing device 6 further comprises a transmission device 24, by means of which e.g. the test signals 17 or other data can be transmitted to e.g. a control point (not shown). The transmission device 24 is preferably designed for wireless transmission via e.g. radio data network, GSM, etc.

During the journey of the train 1 and during operation of the testing device 6, the profile sensors 13 continuously detect a compliance or non-compliance with the profile 7. In the exemplary embodiment variant shown in FIGS. 1 to 4, the outer contours 14 of the vehicles 4 of the train 1 are recorded and provided with a time stamp as part of said detection. The test signals 17, e.g. images of the outer contours 14, are saved in the storage device 18. At the same time, the orientation unit 12 records the current orientation of the train 1 in each case and returns this information as an orientation signal 25 to the evaluation device 11. The profile sensors 13 usually determine a valid image of the outer contour of the train 1 when the vehicles 4 of the train 1 are travelling in a straight line, for example, and are therefore oriented parallel to each other. For example, the location sensor 21 can be used to determine the positions and angularities of the profile sensors, from which a parallel situation of the vehicles 4 can be inferred. Therefore the orientation unit 12 informs the evaluation device 11 via the orientation signal 25 whether the profile sensors 13 are able to return a signal 17 which is representative of the compliance or non-compliance with the profile 7. This means that the evaluation device 11 can evaluate the test signals 17 as a function of the orientation signal 25 with reference to the time stamp, and thus reliably monitor the profile 7. The evaluation of the test signals 17 is effected e.g. by means of comparison with saved images or data for the permitted profile 7.

Various profile sensors 13 can observe different segments of the outer contour 14, such that a segment-specific evaluation is possible. Segments of the outer contour 14 are e.g. the sides or the roof of the vehicles 4. Alternatively, individual vehicles can also form segments.

If a failure to comply with the profile 7 is determined, the testing device 6 outputs an alarm signal to the traction unit driver and/or via the transmission device 24 to the control point. In addition, automatic braking of the train 1 can also be initiated.

In addition, a further alarm signal can be output if it was not possible to determine compliance with the profile 7 during a defined time window.

As a result of storing the test signals 17, these are also available for the purpose of documentation for the entire time window of a journey of the train 1. Using the inventive testing device 6, it is also possible to determine those changes to the outer contour 14 of the vehicles 4 of the train 1 which, at the time they are identified, do not yet indicate a failure to comply with the profile 7 or with the clearance profile 8. These changes can be reported to the traction unit driver as a warning, e.g. after reaching a quantity which can be parameterized.

The invention claimed is:

1. A testing device for monitoring a defined profile of a train of vehicles, the testing device comprising:
   at least one sensor device configured to detect a compliance or non-compliance with the profile from onboard the train itself, said at least one sensor device determining a test signal being representative of the compliance or non-compliance with the profile, at least as a function of an orientation of the train; and
   an evaluation device configured to evaluate the test signal and independently recognize when detection of the profile by said at least one sensor device is impossible or erroneous.

2. The testing device according to claim 1, wherein the vehicles are rail vehicles.

3. The testing device according to claim 1, which further comprises at least one orientation unit configured to determine the orientation of the train or of at least one vehicle of the train.

4. The testing device according to claim 3, wherein said at least one orientation unit includes a curve sensor configured to determine a curved direction of travel of at least one vehicle of the train.

5. The testing device according to claim 3, wherein said at least one orientation unit includes a gradient sensor configured to determine a gradient of at least one vehicle of the train.

6. The testing device according to claim 3, wherein said at least one orientation unit includes a location sensor for determining a location of at least one vehicle of the train relative to a track.

7. The testing device according to claim 3, wherein said at least one orientation unit includes a gyroscope.

8. The testing device according to claim 3, wherein said at least one orientation unit includes:
 a curve sensor configured to determine a curved direction of travel of at least one vehicle of the train;
 a gradient sensor configured to determine a gradient of at least one vehicle of the train;
 a location sensor for determining a location of at least one vehicle of the train relative to a track; and
 a gyroscope.

9. The testing device according to claim 1, wherein said at least one sensor device has at least one profile sensor for determining an outer contour of at least one vehicle of the train.

10. The testing device according to claim 1, which further comprises at least one storage device configured to store the test signal.

11. The testing device according to claim 1, which further comprises at least one transmission device configured to transmit the test signal in a wired or wirelessly manner.

12. The testing device according to claim 1, wherein said at least one sensor device is configured for detection in a longitudinal direction of the train.

13. A vehicle, comprising the testing device according to claim 1.

14. The vehicle according to claim 13, wherein the vehicle is a rail vehicle in the form of a train.

15. The vehicle according to claim 13, which further comprises an outer vehicle skin, said at least one sensor device of the testing device being disposed at a distance from said outer vehicle skin.

16. The testing device according to claim 1, wherein the detection of the profile is impossible or erroneous when the train is traveling in a curved direction.

17. A method for checking a defined profile of a train of vehicles, the method comprising the following step:
 detecting a compliance or non-compliance with the profile from onboard the train itself by determining a test signal being representative of the compliance or non-compliance with the profile, at least as a function of an orientation of the train; and
 evaluating the test signal to independently recognize when detection of the profile is impossible or erroneous.

18. The method according to claim 17, wherein the vehicles are rail vehicles.

19. The method according to claim 17, wherein the detection of the profile is impossible or erroneous when the train is traveling in a curved direction.

* * * * *